US008665471B2

(12) United States Patent
Kanai

(10) Patent No.: US 8,665,471 B2
(45) Date of Patent: Mar. 4, 2014

(54) PRINT SYSTEM

(75) Inventor: Naoki Kanai, Tokyo (JP)

(73) Assignee: Oki Data Corporation, Tokyo (JP)

(*) Notice: Subject to any disclaimer, the term of this patent is extended or adjusted under 35 U.S.C. 154(b) by 656 days.

(21) Appl. No.: 12/910,913

(22) Filed: Oct. 25, 2010

(65) Prior Publication Data
US 2011/0102837 A1 May 5, 2011

(30) Foreign Application Priority Data

Oct. 29, 2009 (JP) ................................. 2009-249163

(51) Int. Cl.
*G06F 3/12* (2006.01)
*G06K 15/00* (2006.01)

(52) U.S. Cl.
USPC ........................... 358/1.15; 358/1.14; 358/1.1

(58) Field of Classification Search
None
See application file for complete search history.

(56) References Cited

U.S. PATENT DOCUMENTS

| 7,761,427 B2 * | 7/2010 | Martin et al. .................. 707/661 |
| 7,869,079 B2 * | 1/2011 | Riesel et al. .................. 358/1.18 |
| 8,422,045 B2 * | 4/2013 | Yamada ........................ 358/1.14 |
| 2003/0095284 A1 * | 5/2003 | Parry ............................ 358/1.16 |
| 2006/0023252 A1 | 2/2006 | Kanai |
| 2008/0007781 A1 * | 1/2008 | Oike et al. .................... 358/1.16 |
| 2008/0049249 A1 * | 2/2008 | Tomita ......................... 358/1.15 |
| 2008/0080001 A1 * | 4/2008 | Yamada ........................ 358/1.15 |

FOREIGN PATENT DOCUMENTS

| JP | 2001-071593 A | 3/2001 |
| JP | 2002-209073 A | 7/2002 |
| JP | 2005-064657 A | 3/2005 |
| JP | 2005-150892 A | 6/2005 |
| JP | 2005-174084 A | 6/2005 |
| JP | 2006-39908 A | 2/2006 |
| JP | 2006-155548 A | 6/2006 |
| JP | 2006-163794 A | 6/2006 |
| JP | 2006-285900 A | 10/2006 |

* cited by examiner

*Primary Examiner* — Satwant Singh
(74) *Attorney, Agent, or Firm* — Marvin A. Motsenbocker; Mots Law, PLLC

(57) ABSTRACT

A controller able to communicate with print devices each of which is configured to print a file on a medium, includes: a storage; a folder specifying unit configured to specify a folder stored in the storage as a print target folder; a destination specifying unit configured to specify one of the print devices as a destination print device; a file analyzing unit configured to analyze a format of each of print target files, which are all files in all hierarchical levels in the print target folder, and to determine whether each print target file is a printable file formats which has one of formats printable by the destination print device; and a transmission unit configured to transmit, to the destination print device, the printable format file.

26 Claims, 9 Drawing Sheets

INTERNAL CONFIGURATION OF STORAGE 20 SHOWN IN FIG. 1

OPERATION OF EVENT HANDLER 11 IN RESPONSE TO RIGHT-CLICK

DIRECT PRINT DIALOG BOX 50

DIRECT PRINT DIALOG BOX 50 WITH ICON 51b CLICKED

DIRECT PRINT DIALOG BOX 50 WITH ICON 52b CLICKED

EXTENSION TABLES 16a-1 AND 16b-1 OF PRINTER DRIVERS 16a AND 16b

FIG. 10

SENT FILE HISTORY 70 IN SENT FILE HISTORY STORAGE 17 SHOWN IN FIG. 9

| STORAGE NUMBER | FILE SIZE [Bytes] | FILE UPDATE TIME | CHECKSUM (HEXADECIMAL) |
|---|---|---|---|
| 1 | 427,523 | 16:43:19, AUGUST 21, 2008 | D23386a3d51d256a402c2c807b8c14a2 |
| 2 | 62,464 | 13:56:47, AUGUST 10, 2008 | E7c102a6c8a07b66c9541c9cd051cff |
| 3 | 258,048 | 19:56:41, JULY 3, 2009 | A871036bc5d02f55c22e007163224737 |
| ... | ... | ... | ... |

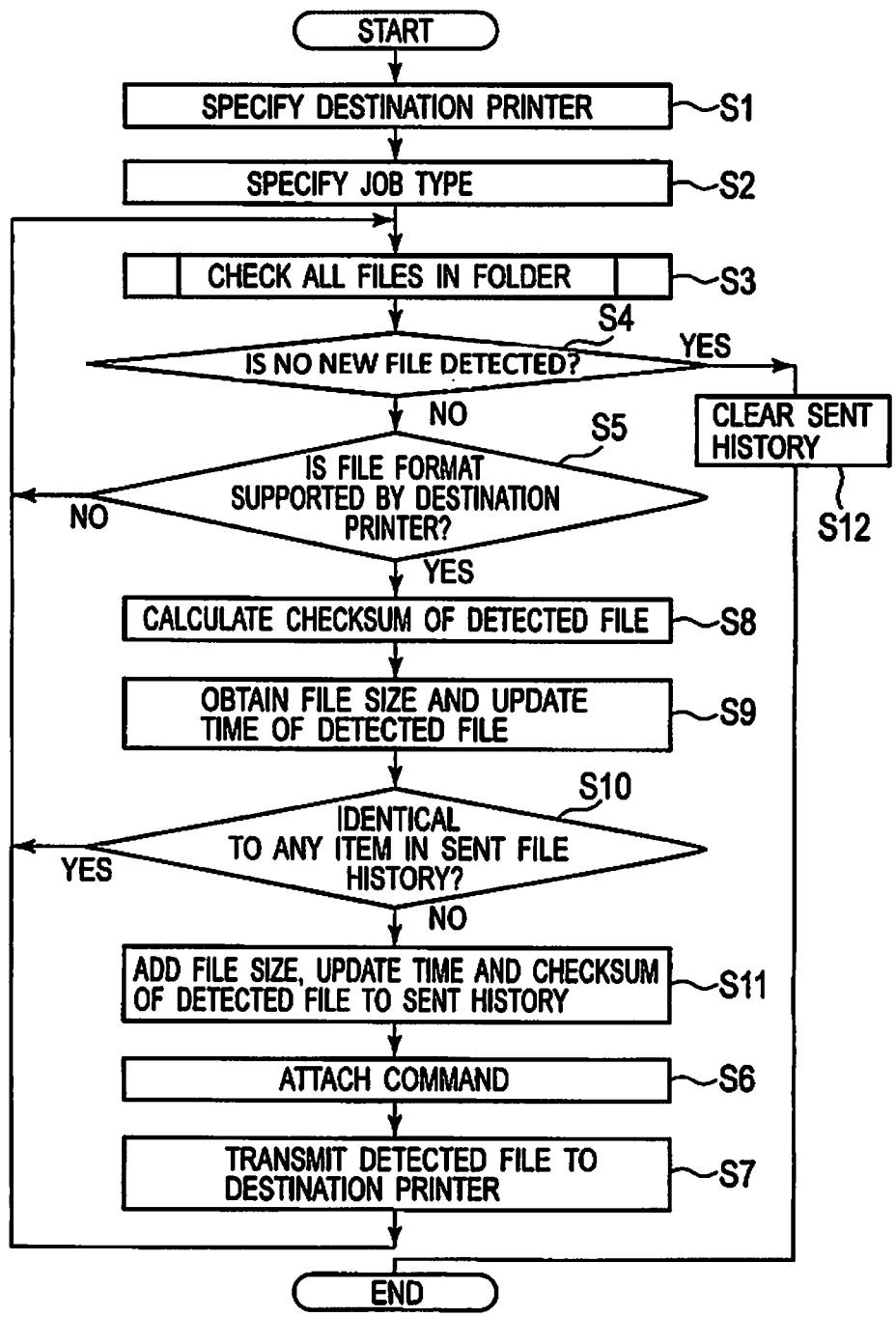

PRINT SYSTEM

CROSS REFERENCE TO RELATED APPLICATIONS

This application claims priority based on 35 USC 119 from prior Japanese Patent Application No. P2009-249163 filed on Oct. 29, 2009, entitled "Print System and Image Forming Apparatus", the entire contents of which are incorporated herein by reference.

BACKGROUND OF THE INVENTION

1. Field of the Invention

An aspect of the invention relates to a print system.

2. Description of Related Art

A conventional print system includes printers and an external device such as a host computer, wherein the external device selects an electrical file therein, selects one of the printers that supports direct-printing of the selected electric file of a specific file format as a destination printer, and sends the selected electric file to the destination printer, and then the destination printer prints the selected file.

As a direct-printable electric file format, which is a file format that is able to be direct-printed by a printer, there has been known a PDF (Portable Document Format; Registered trademark), an XPS (XML Paper Specification), a PS (Post-Script; Registered trademark), an EPS (Encapsulated Post-Script; Registered trademark), a JPEG or JPG (Joint Photographic Experts Group), a TIF (Tagged Image File Format), a PCL (Printer Control Language; Registered trademark), a PJL (Printer Job Language), and an HTML (Hyper Text Markup Language).

Japanese Patent Application Laid-Open No. 2006-39908 discloses a print system that is capable of performing a broadcast printing with general-purpose applications and drivers, wherein a host computer allows a user to select files and destination printers for each of the selected files, and the host computer transmits, in response to a single print instruction, the files to the corresponding destination printers, in order to cause the destination printers to print the files, respectively.

SUMMARY OF THE INVENTION

However, in the print system disclosed in Japanese Patent Application Laid-Open No. 2006-39908, a user operation of selecting plural files may be troublesome. In the print system, a user operation of screening for a duplicate file to prevent printing the duplicate file may be also troublesome.

A first aspect of the invention is a print system including print devices each of which is configured to print a file on a medium; and a controller able to communicate with the print devices. The controller includes: a storage; a folder specifying unit configured to specify a folder stored in storage as a print target folder, a destination specifying unit configured to specify one of the print devices as a destination print device; a file analyzing unit configured to analyze all files in the print target folder, and a transmission unit configured to transmit, to the destination print device, all the files.

According to the first aspect, a user does not need to analyze all files in a folder.

A second aspect of the invention is a print system including: print devices each of which is configured to print a file on a medium; and a controller able to communicate with the print devices. The controller includes: a storage; a folder specifying unit configured to specify a folder stored in the storage as a print target folder; and a destination specifying unit configured to specify one of the print devices as a destination print device; a file analyzing unit configured to analyze the format of each of print target files, which are all files in all hierarchical levels in the print target folder, and to determine whether each print target file is a printable format file, which has one of the formats printable by the destination print device; and a transmission unit configured to transmit the printable format file to the destination print device.

According to the second aspect, by specifying a folder as a print target folder and a print device as a destination print device, all the printable format files in the print target folder are sent to a destination print device and will be printed by the destination print device. Thus, a user does not need to analyze the format of each file in a folder in order to determine if each file is printable in the destination print device.

A third aspect of the invention is a controller able to communicate with the print devices, each of which is configured to print a file on a medium, including: a storage; a folder specifying unit configured to specify a folder stored in the storage as a print target folder; a destination specifying unit configured to specify one of the print devices as a destination print device; a file analyzing unit configured to analyze the format of each of print target flies, which are all files in all hierarchical levels in the print target folder, and to determine whether each print target file is a printable file format which has one of the formats printable by the destination print device; and a transmission unit configured to transmit, to the destination print device, the printable format file.

According to the third aspect, by specifying a folder as a print target folder and a print device as a destination print device, all the printable format files in the print target folder are sent to a destination print device and will be printed by the destination print device. Thus, a user does not need to analyzing the format of each file in a folder in order to determine if each file is printable in the destination print device.

A fourth aspect of the invention is a print device including: a print engine configured to print a file on a medium; an interface unit able to communicate with a storage connectable to the print device; a folder specifying unit configured to specify one of folders stored in the storage as a print target folder, a file analyzing unit configured to analyze the format of each of print target files, which are all files in all hierarchical levels in the print target folder, and to determine whether each print target file is a printable format file which has one of formats printable by the print engine, and a transmission unit configured to transmit, to the print engine, the printable format file.

According to the fourth aspect, by specifying a folder in the storage, such as an external memory connectable to the print device or an internal memory in an external device connectable to the print device, as a print target folder, all printable format files in the print target folder are printed by the print device. Thus, a user does not need to analyze the format of each file in a folder in order to determine if each file is printable in the destination print device.

BRIEF DESCRIPTION OF THE DRAWINGS

FIG. 10 is a view of an example of sent file history 70 of sent file history storage 17 shown in FIG. 9.

FIG. 11 is a flowchart of the operation of print system 1A shown in FIG. 9.

DETAILED DESCRIPTION OF THE EMBODIMENTS

Figure 1:
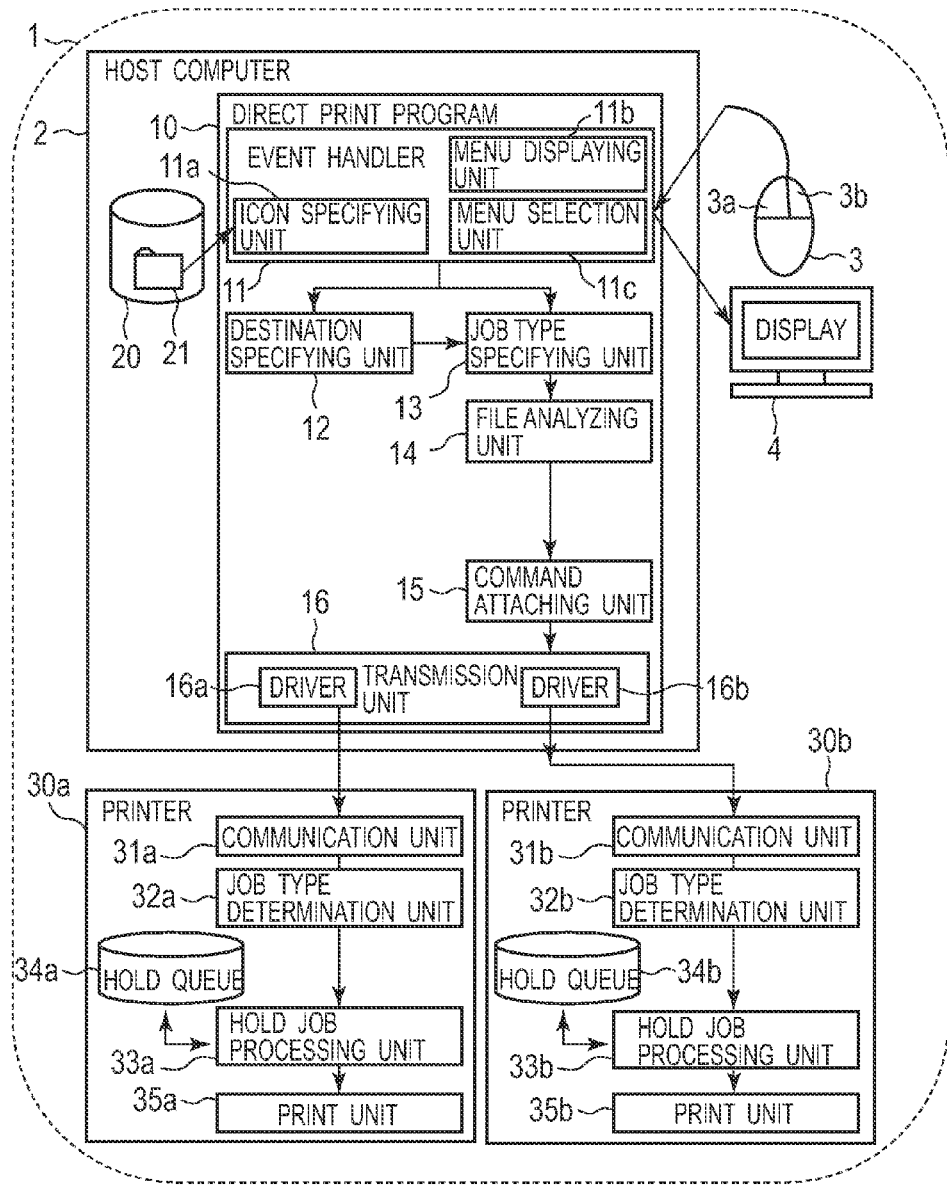
FIG. 1 is a diagram of the entire configuration of print system 1 according to a first embodiment of the invention.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

First Embodiment

Configuration of First Embodiment

FIG. 1 is a diagram of the entire configuration of print system 1 according to a first embodiment of the invention.

Print system 1 includes host computer 2 with mouse 3 and display 4 and printers 30a and 30b connected to host computer 2 via a network. Host computer 2 includes an unillustrated central processing unit (hereinafter, referred to as "CPU") therein and functions as a control means to transmit a file to printer 30a or 30b via the network by using the CPU. Host computer 2 includes therein direct print program 10 and storage 20 in which folder 21 or the like is to be stored.

Mouse 3 is provided at its upper face with left button 3a and right button 3b and at its lower face with an unillustrated location detection sensor. Note that clicking right button 3b of mouse 3 is referred to as a "right click" and clicking left button 3a of mouse 3 is simply referred to as a "click".

Direct print program 10 includes event handler 11, output destination specifying unit 12, job type specifying unit 13, file analyzing unit 14, job type command attaching unit 15, and transmission unit 16. Direct print program 10 is previously installed in host computer 2 and operates as a resident service program.

Event handler 11 functions as a folder specifying unit to specify one of folder 21 or the like stored in storage 20 as a print target folder. Event handler 11 includes icon specifying unit 11a, menu displaying unit 11b, and menu selecting unit 11c.

Icon specifying unit 11a is configured to specify folder 21 or the like in response to an operation of mouse 3. Menu displaying unit 11b is configured to display a menu having plural operation menu items for a folder (for example, folder 21) that is specified by icon specifying unit 11a. Menu selection unit 11c is configured to select and execute one of the operation menu items in response to an operation of mouse 3.

Destination-specifying unit 12 is configured to determine which of printers 30a and 30b is selected as a destination printer. Job type specifying unit 13 is configured to determine which one of job types, "Print", "Print and Hold", and "Hold" is selected.

File analyzing unit 14 is configured to analyze whether each file in all hierarchical levels in the print target folder (for example, folder 21) is a direct-printable format file, which has one of the file formats that are directly-printable by the destination printer 30a or 30b. All of the direct-printable format files are transmitted to command attaching unit 15.

When "Hold" is specified as a job type, command attaching unit 15 transmits, to transmission unit 16, the direct-printable format file with a "hold command" attached. When "Print and Hold" is specified as a job type, command attaching unit 15 transmits, to transmission unit 16, the direct-printable format file with a "print and hold command". When "Print" is specified as a job type, command attaching unit 15 transmits, to transmission unit 16, the direct-printable format file with no command.

Transmission unit 16 includes printer drivers 16a and 16b. Transmission unit 16 is configured to receive the direct-printable format file from command attaching unit 15 and to transmit it from printer drivers 16a and 16b to the destination printer 30a or 30b that is specified by destination-specifying unit 12 via the network.

Printer 30a includes communication unit 31a, job type determination unit 32a, hold job processing unit 33a, hold queue 34a, and print unit 35a (print engine).

Communication unit 31a is configured to receive the direct-printable format file from direct print program 10 through the network and to transmit it to job type determination unit 32a. Job type determination unit 32a is configured to determine which command such as the "hold command" and the "print and hold command" is attached to the direct-printable format file, and to transmit the direct-printable format file to hold job processing unit 33a.

When it is determined that no command is attached to the direct-printable format file, which means printing is instructed, hold job processing unit 33a transmits the direct-printable format file to print unit 35a. When it is determined that the "hold command" is attached to the direct-printable format file, hold job processing unit 33a stores the direct-printable format file into hold queue 34a. When it is determined that the "print and hold command" is attached to the direct-printable format file, hold job processing unit 33a transmits the direct-printable format file to print unit 35a and stores the direct-printable format file to hold queue 34a.

Note that upon receiving a print start instruction to start priming the direct-printable format file that is stored in hold queue 34a, hold job processing unit 33a transmits the direct-printable format file from hold queue 34a to print unit 35a. For example, the print start instruction is generated when the user pushes an unillustrated start button provided on the destination printer (30a or 30b) or when the user clicks an unillustrated print start button in an unillustrated dialog box displayed on display 4 of host computer 2A.

Hold queue 34a is a queue configured to store therein and extract therefrom the direct-printable format file. Print unit 35a is configured to print the direct-printable format file that is transmitted from hold job processing unit 33a onto a print medium such as a sheet medium or the like.

Printer 30b has communication unit 31b, job type determination unit 32b, hold job processing unit 33b, hold queue 34b and print unit 35b that have the same configuration as those of printer 30a.

Figure 2:
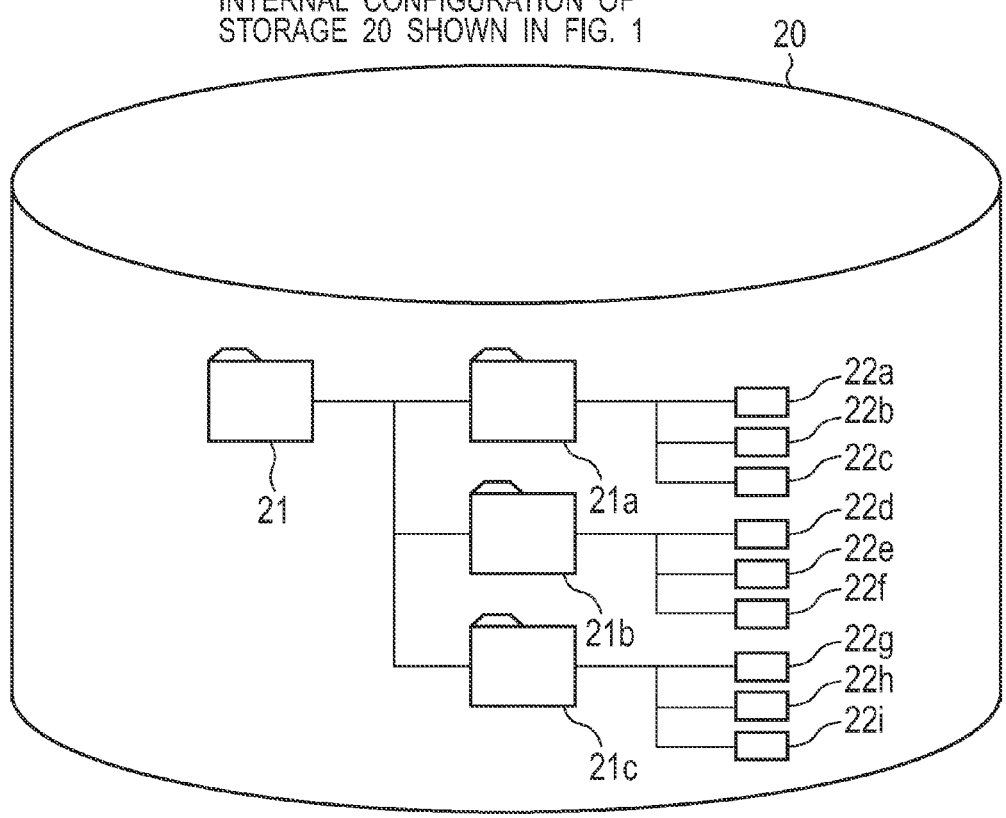
FIG. 2 is a view of an example of the internal configuration of storage 20 shown in FIG. 1.

FIG. 2 is a view of an example of folders and files stored in storage 20 shown in FIG. 1.

Sub-folder 21a, sub-folder 21b, and sub-folder 21c are stored in folder 21.

Files 22a to 22c are stored in sub-folder 21a, files 22d to 22f are stored in sub-folder 21b, and files 22g to 22i are stored in sub-folder 21c. Note that "all files in folder 21" means "all files in all hierarchical levels in folder 21" and are, in this example, files 22a to 22i.

Figure 3:
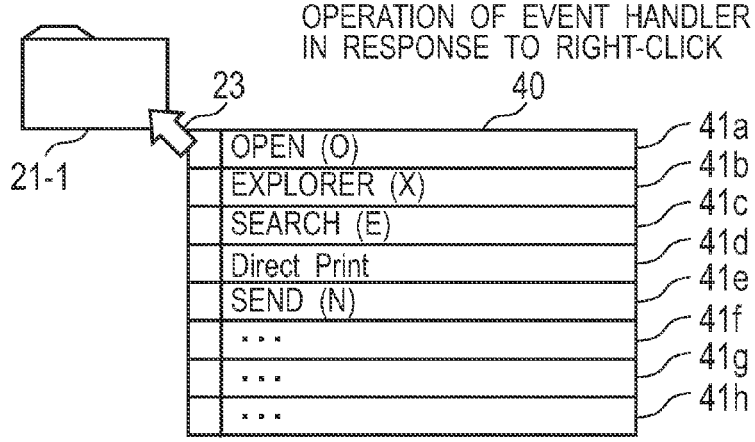
FIG. 3 is a view of an example of a display screen image executed by event handler 11 of FIG. 1 when a folder is right-clicked.

FIG. 3 is a view of an example of a display screen image executed by event handler 11 shown in FIG. 1 when a folder is right-clicked.

Mouse cursor 23 is an arrow-shaped icon pointing to the upper left. Mouse 3 is configured to detect the position change thereof and to transmit the position change information to icon specifying unit 11a. Icon specifying unit 11a is configured to move mouse cursor 23 around according to the position change of mouse 3.

FIG. 3 illustrates mouse cursor 23 and icon 21-1 of folder 21 beneath mouse cursor 23, which is to be specified by mouse 3. When icon 21-1 is right-clicked, menu displaying unit 11b shows right-click menu 40, which is an operation menu with respect to folder 21.

Right-click menu 40 contains menu items 41a to 41h. Right-click menu 40 is displayed upon a right-click (that is, to click right button 3b of mouse 3) and disappears upon a click (that is, to click left button 3a of mouse 3). When one of menu items 41a to 41h is clicked, menu selection unit 11c executes an operation corresponding to the clicked one of menu items 41a to 41h. For, example, when menu item 41d corresponding to "Direct Print" is clicked, menu selection unit 11c displays a dialog box corresponding to a direct print.

Figure 4:
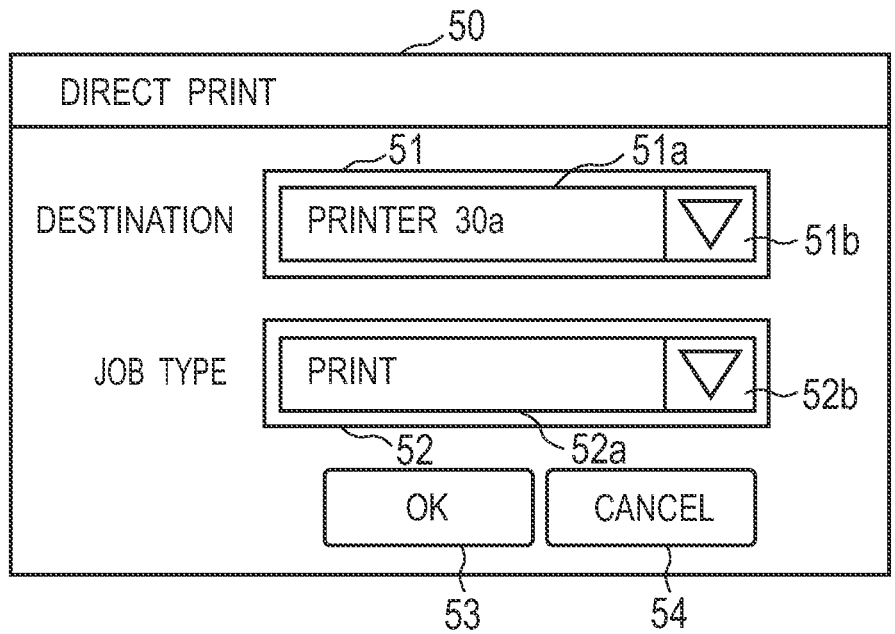
FIG. 4 is a view of an example of a display screen image of direct print dialogue box 50 shown by event handler 11 of FIG. 1.

FIG. 4 is a view of an example of a display screen image of direct print dialogue box 50 executed by event handler 11 shown in FIG. 1.

Direct print dialogue box 50 includes destination selecting combo box 51, job type selecting combo box 52, OK button 53, and cancel button 54.

Destination selecting combo box 51 includes drop-down list icon 51b and destination printer display area 51a. Like destination selecting combo box 51, job type selecting combo box 52 includes drop-down list icon 51b and job type display area 52a. When OK button 53 is clicked, direct print dialogue box 50 disappears and direct print program 10 starts to process step S1. When cancel button 54 is clicked, direct print dialogue box 50 disappears and the process of direct print program 10 is cancelled.

Figure 5:
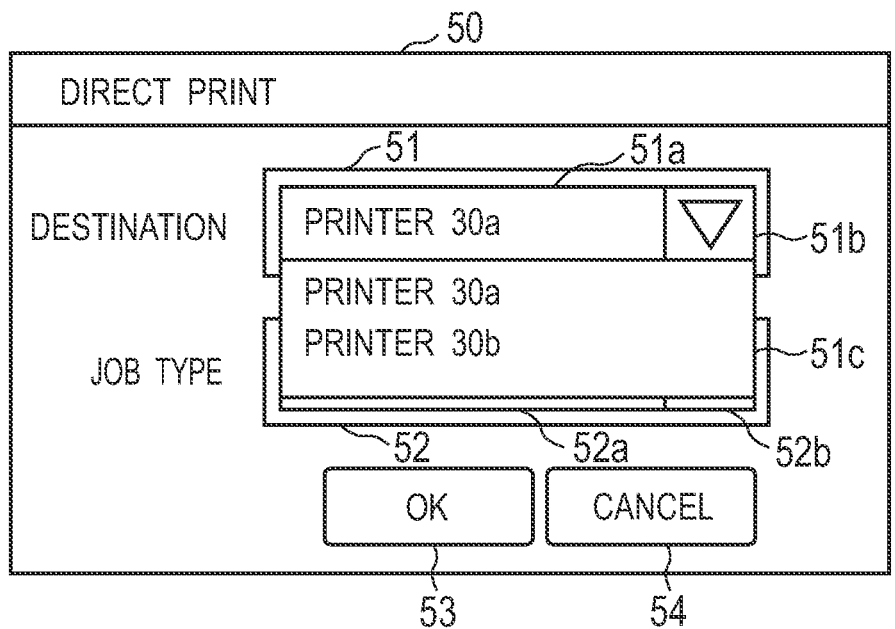
FIG. 5 is a view of an example of a display screen image of direct print dialogue box 50 when drop-down list icon 51b shown in FIG. 4 is clicked.

FIG. 5 is a view of an example of a display screen image of direct print dialogue box 50 when drop-down list icon 51b shown in FIG. 4 is clicked.

When drop-down list 51b is clicked, drop-down list 51c used for selecting one of the destination printers is displayed beneath destination printer display area 51a as shown in FIG. 5. When printer 30a or 30b in selection drop-down list 51c is selectively clicked, drop-down list 51c disappears and destination printer display area 51a shows the name of the selected printer (30a or 30b).

In the example shown in FIG. 5, "printer 30a" is displayed in destination printer display area 51a of destination selecting combo box 51 as a destination, while "printer 30a" and "printer 30b" are displayed in drop-down list 51c as selectable destinations since drop-down list icon 51b has been clicked.

Figure 6:
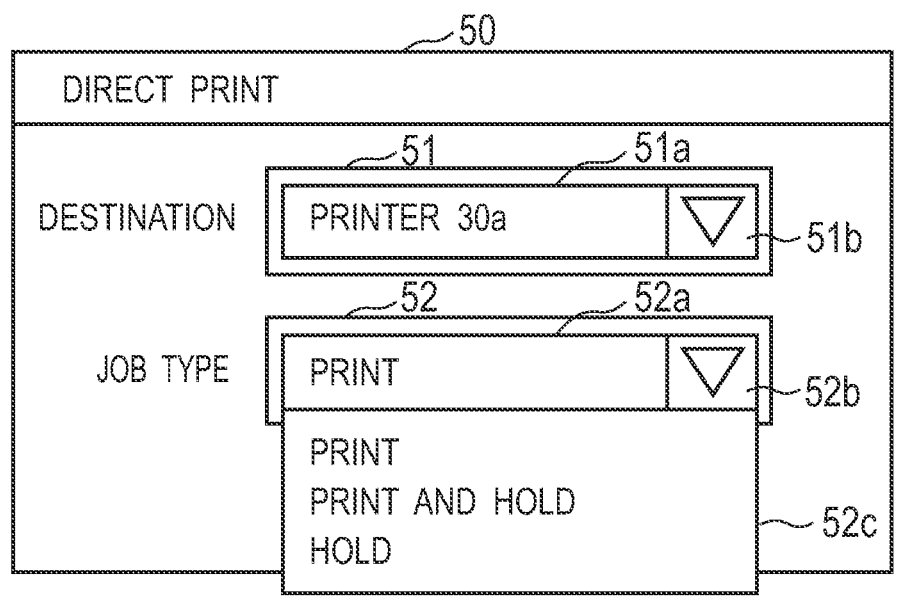
FIG. 6 is a view of an example of a display screen image of direct print dialogue box 50 when drop-down list icon 52b shown in FIG. 4 is clicked.

FIG. 6 is a view of an example of a display screen image of direct print dialogue box 50 when drop-down list icon 52b shown in FIG. 4 is clicked.

When drop-down list icon 52b is clicked, drop-down list 52c used for selecting one of the job types is displayed beneath job type display area 52a of job type selecting combo box 52. When one of the job types is selectively clicked in drop-down list 52c, drop-down list 52c disappears and job type display area 52a shows the name of the selected job type.

In the example shown in FIG. 6, "Print" is displayed in job type display area 52a of job type selecting combo box 52 as the job type, and "Print", "Print and Hold", and "Hold" are displayed in drop-down list 52c as selectable job types since drop-down list icon 52b has been clicked.

Figure 7:
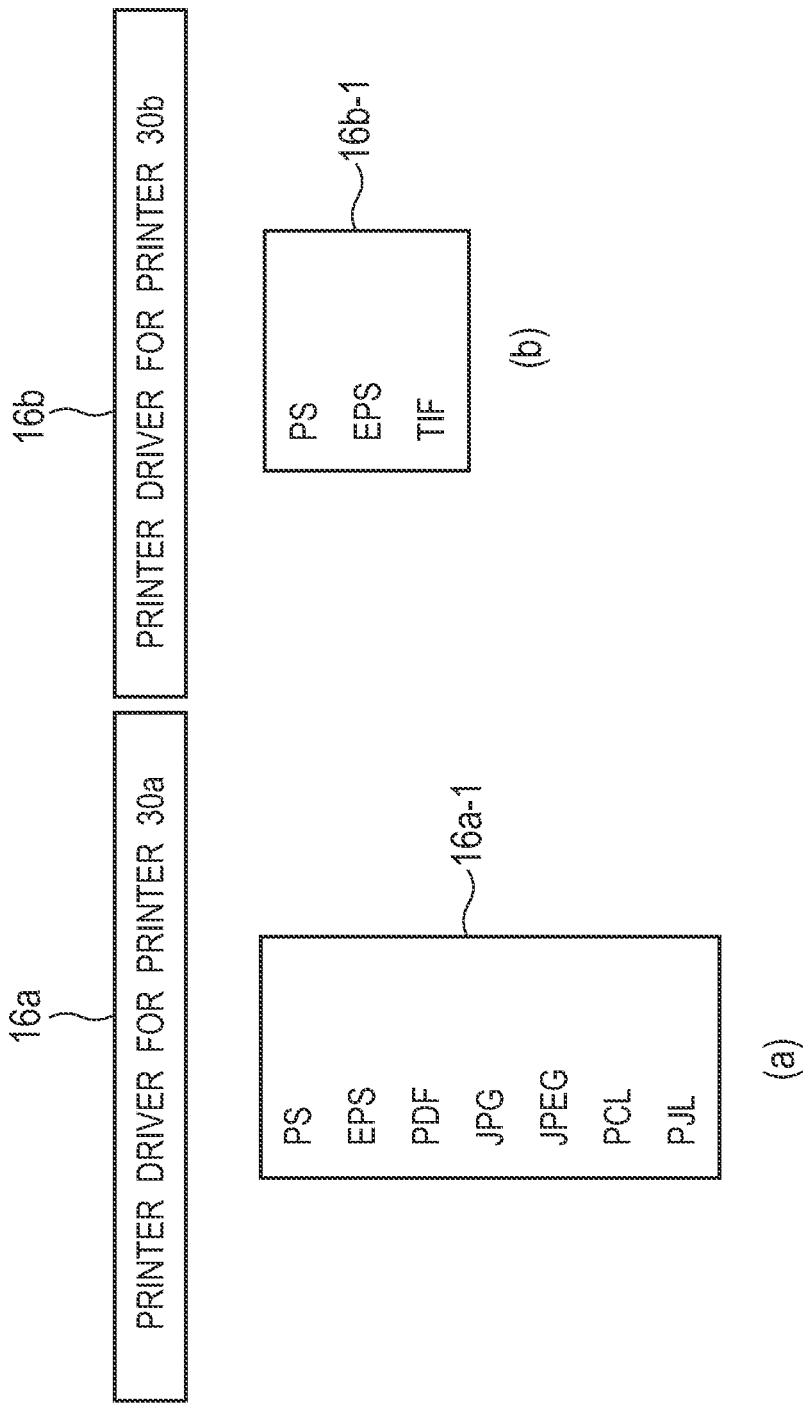
FIGS. 7A and 7B are views of examples of extension lists 16a-1 and 16b-1 of printer drivers 16a and 16b shown in FIG. 1.

FIGS. 7A and 7B are extension lists 16a-1 and 16b-1 showing extensions that are supported by printer drivers 16a and 16b of printers 30a and 30b.

FIG. 7A illustrates extension list 16a-1 for printer driver 16a, listing extensions of files that are able to be direct-printed by printer 30a. That is, printer 30a is able to print a file in any file format of PS, EPS, PDF, JPEG, JPG, PCL, and PJL.

FIG. 7B illustrates extension list 16b-1 for printer driver 16b, listing extensions of files that are able to be direct-printed by printer 30b. That is, printer 30b is able to print a file in any file format of PS, EPS, and TIF.

Operation of First Embodiment

When folder icon 21-1 shown in FIG. 3 is right-clicked by using mouse cursor 23, icon specifying unit 11a of event handler 11 shown in FIG. 1 determines whether or not printer 30a or 30b is connected to print system 1. When printer 30a or 30b is connected to print system 1, menu displaying unit 11b displays, on display 4, right-click menu 40 shown in FIG. 3 with menu item 41d of "Direct Print" being added therein by using the operating system of host computer 2. On the other hand, when no printer 30a or 30b is connected to print system 1, menu displaying unit 11b display right-click menu 40 without menu item 41d of "Direct Print".

Then, when menu item 4W of "Direct Print" is clicked by using mouse 3, menu selection unit 11c displays, on display 4, direct print dialogue box 50 shown in FIG. 4 for inquiring a destination printer (30a or 30b) and an job type.

Figure 8:
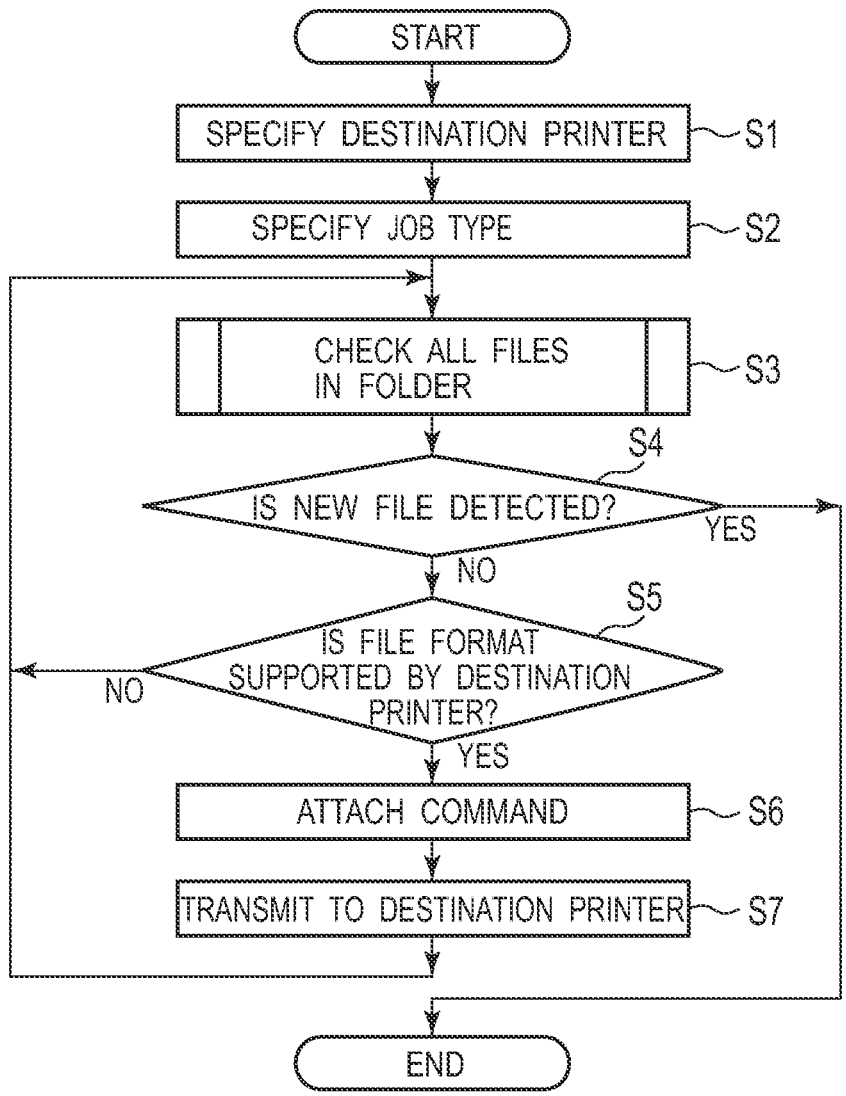
FIG. 8 is a flowchart of the operation of print system 1 shown in FIG. 1.

FIG. 8 is a flowchart of the operation of host computer 10 after menu item 41d of "Direct Print" is clicked, especially showing a detailed operation after a destination printer (30a or 30b) and an job type are selected by using direct print dialogue box 50.

When menu item 41d of "Direct Print" shown in FIG. 3 is clicked, direct print dialogue box 50 shown in FIG. 4 is displayed and then the operation of FIG. 8 starts.

In step S1, destination-specifying unit 12 shown in FIG. 1 memorizes a destination printer, which is printer 30a or 30b, that is specified by using direct print dialogue box 50 shown in FIG. 5.

In step S2, job type specifying unit 13 shown in FIG. 1 memorizes an job type, which is "Print", "Hold", or "Print and Hold", that is specified by using direct print dialogue box 50 shown in FIG. 6. The job type includes "Print" to print the direct-printable format files, "Hold" to store the printable files to a hold queue of the destination printer (that is, hold queue 34a of printer 30a or hold queue 34b of printer 30b) without printing them in the destination printer, and "Print and Hold" to print the re-printable files and then store direct-printable format files to the hold queue of the destination printer such that the direct-printable format files that are stored in the hold queue of the destination printer are able to be printed again by the destination printer after the printable format file has been printed.

In step S3, file analyzing unit 14 checks, one by one, all files in folder 21 (that is, all files in all hierarchical levels of folder 21 shown in FIG. 2) corresponding to folder icon 21-1 that was appointed with mouse cursor 23 of FIG. 3 when a right-click event occurred. Note that all files in all hierarchical levels of folder 21 shown in FIG. 2 are files 22a to 22i, in this example.

In step S4, file analyzing unit 14 determines whether the check of all the files in the folder is completed or not, and then proceeds to step S5 when the check is not completed (NO, in step S4) and ends the process of FIG. 8 when the check is completed (YES, in step S4). In other words, step S4 (file analyzing unit 14) precedes to step S5 if a new file is detected in step S3, and step S4 (file analyzing unit 14) proceeds to end the process of FIG. 8 if no new file is detected in step S3.

In step S5, file analyzing unit 14 determines whether or not the new detected file is a direct-printable format file in the destination printer, which is able to be direct-printed in the destination printer (30a or 30b). Specifically, file analyzing unit 14 obtains an extension list (16a-1 or 16b-1) corresponding to the destination printer (30a or 30b), which lists the extensions of files that are able to be direct-printed by the destination printer (30a or 30b), and determines whether or not an extension of the new detected file is found in the extensions in the extension list (16a-1 or 16b-1) of the destination printer (30a or 30b). Note that extension list 16a-1 corresponding to printer driver 16a of printer 30a and extension list 16a-1 corresponding to printer driver 16b of printer 30b are previously stored as extension list files.

For example, in the case where printer 30a was selected as a destination printer by using direct print dialogue box 50 shown in FIG. 5, file analyzing unit 14 compares the extension of the new detected file with extension list 16a-1 in printer driver 16a of printer 30a. When the extension of the new detected file is the same as one of the extensions (PS, EPS, PDF, JPEG, JPG, PCL, and PJL) listed in extension list 16a-1 (Yes, in step S5), file analyzing unit 14 determines that the new detected file is supported by the destination printer 30a (that is, the new detected file is a direct-printable format file, which is able to be direct-printed by the destination printer 30a) and proceeds to step S6. On the other hand, when the extension of the new detected file does not correspond to any of the extensions (PS, EPS, PDF, JPEG, JPG, PCL, and PJL) listed in extension list 16a-1 (Yes, in step S5), file analyzing unit 14 determines that the new detected file is not supported by the destination printer 30a (that is, the new detected file is unable to be direct-printed by the destination printer 30a) and returns to step S3.

In step S6, command attaching unit 15 attaches a hold command to the direct-printable format file if the specified job type is "Hold" or "Print and Hold".

In step S7, transmission unit 16 transmits the direct-printable format file to the destination printer (30a or 30b) that is specified in step S1 and then returns to step S3.

Effects of First Embodiment

According to the first embodiment, all files 22a to 22i in folder 21 (that is, all files 22a to 22i in all the hierarchical levels of folder 21) can be direct-printed, simply by selecting "Direct Print" while right-clicking folder 21 and specifying one of printers 30a and 30b as a destination printer. Therefore, a user does not need a time-consuming job to filter direct-printable format files. This simplifies the print operation.

Second Embodiment

Configuration of Second Embodiment

Figure 9:
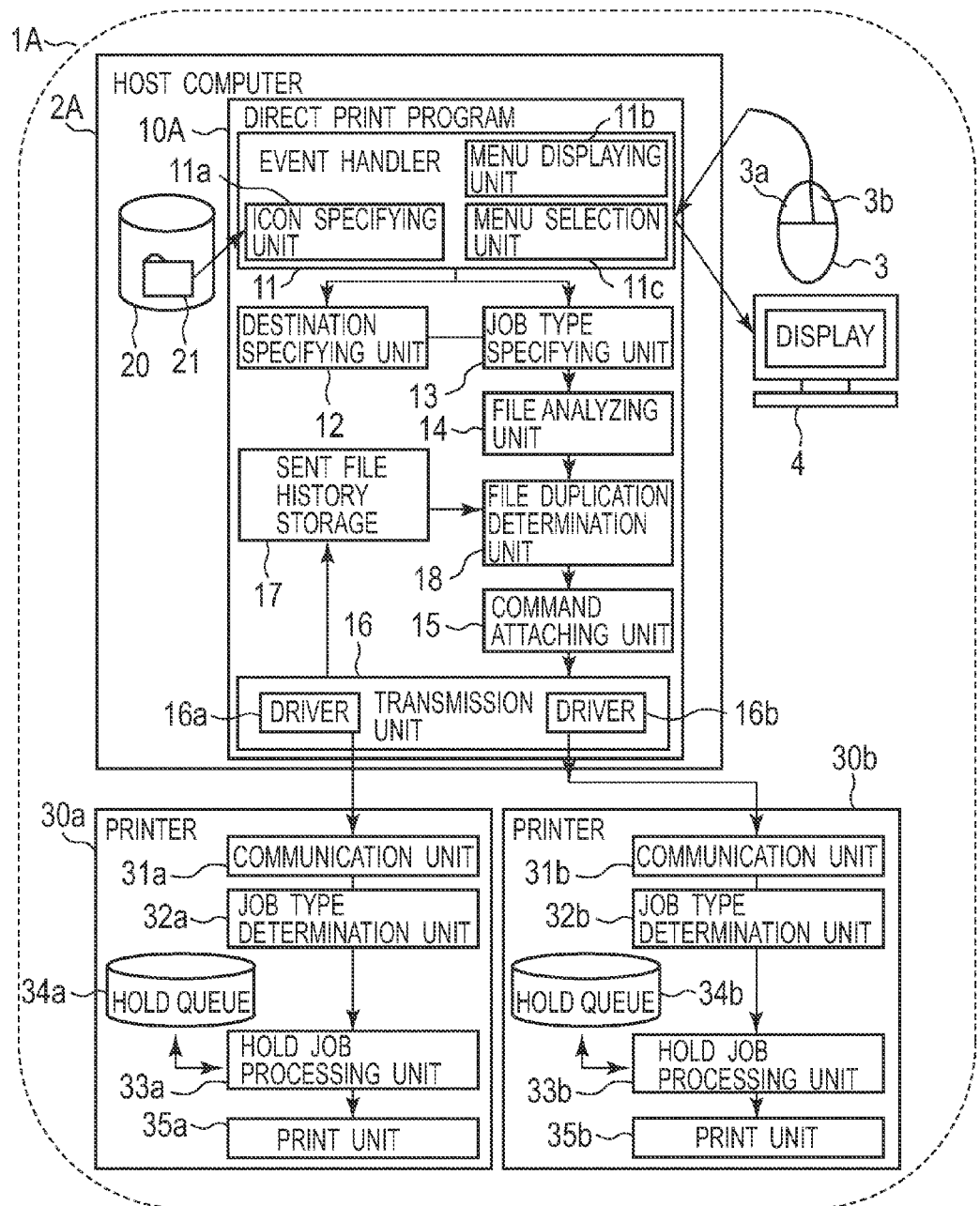
FIG. 9 is a diagram of the entire configuration of print system 1A according to a second embodiment of the invention.

FIG. 9 is a diagram of the entire configuration of print system 1A according to the second embodiment of the invention. In the second embodiment, the same constituents as in the first embodiment are denoted by the same reference numerals as in the first embodiment.

Print system 1A of the second embodiment includes host computer 2A, which has a configuration different from host computer 2 of the first embodiment, and printers 30a and 30b, which have the same configuration as the first embodiment, connected to host computer 2A via a network.

Host computer 2A is connected to mouse 3 and display 4, which are the same as those of the first embodiment. Host computer 2A includes therein: direct print program 10A, which is different from direct print program 10 of the first embodiment, to be executed by the unillustrated CPU: and storage 20, which is the same as that of the first embodiment, to store therein folder 21 or the like.

Direct print program 10A includes sent file history storage 17 and file duplication determination unit 18, in addition to all the configuration of direct print program 10 of the first embodiment.

Sent file history storage 17 stores therein the history of transmitted files that are transmitted from transmission unit 16. File duplication determination unit 18 determines whether or not the direct-printable format file, which is the new detected file that was determined by file analyzing unit 14 to be printable by the destination printer (30a and 30b), is identical to one of the files that have already been transmitted to the destination printer (30a and 30b), and then transmits, to command attaching unit 15, the direct-printable format file that is not identical to one of the files that have already been transmitted to the destination printer (30a and 30b).

The other configurations are the same as those of the first embodiment. FIG. 10 is a view of an example of the storage configuration of sent file history 70 of sent file history storage 17 shown in FIG. 9.

Sent file history 70 includes items which correspond to the transmitted files respectively, and includes storage number 71, file size 72, file update time 73, and checksum 74, for each of the transmitted files. That is, each item in sent file history has storage number 71, file size 72, file update time 73, and checksum 74.

The first item which corresponds to storage number 71 of "1" has file size 72 of "427523 bytes", file update time 73 of "16:43 and 19 seconds on Aug. 21, 2008", and checksum 74 of hexadecimal "d23386a3d51d256a402c2c807b8c14a2".

The second item which corresponds to storage number 71 of "2" has file size 72 of "62464 bytes", file update time 73 of "13:56 and 47 seconds on Aug. 10, 2008", and checksum 74 of hexadecimal "e7c102a6c8a07b66c9541c9cd051cff".

The third item which corresponds to storage number 71 of "3" has file size 72 of "258048 bytes", file update time 73 of "19:56 and 41 seconds on Jul. 3, 2009", and checksum 74 of hexadecimal "a871036bc5d02f55c22e007163224737".

Operation of Second Embodiment

The operation and the screen display executed by event handler 11 shown in FIG. 9 are the same as those of the first embodiment.

FIG. 11 is a flowchart of the operation of host computer 10 after menu item 41d of "Direct Print" is clicked, especially showing a detailed operation after a destination printer (30a or 30b) and an job type are selected by using direct print dialogue box 50.

In FIG. 11, the operation from steps S1 to S3 is the same as that of the first embodiment. In step S4, file analyzing unit 14 determines whether or not the check of all the files in all hierarchical levels of specified folder 21 is completed. Then, file analyzing unit 14 proceeds to step S12 when the check is completed (YES, in step S4) and proceeds to step S5 when the check is not completed (NO, in step S4). In other words, step S4 (file analyzing unit 14) proceeds to step S12 if no new file is detected in step S3, while step S4 (file analyzing unit 14) proceeds to step S5 if a new file is detected in step S3.

In step S8, file duplication determination unit 18 shown in FIG. 9 calculates the checksum of the direct-printable format file. The checksum is calculated based on one or more algorithms of CRC32 (Cyclic Redundancy Check 32), MD5 (Message Digest Algorithm 5), SHA-1 (Secure Hash Algorithm 1), or the like.

In step S9, file duplication determination unit 18 shown in FIG. 9 obtains the size and the update time of the direct-printable format file. In step S10, file duplication determination unit 18 compares the size, the update time, and the checksum of the direct-printable format file with those of each item in sent file history 70 of sent file history storage 17, so as to determine whether any of the items in sent file history 70 has all components identical to those of the direct-printable format file. Sent file history 70 proceeds back to step S3 when one or more of the items of sent file history 70 is identical to the direct-printable format file (YES, in step S9) and proceeds to step S11 when no item is identical to the printable file (NO, in step S9).

In step S11, sent file history storage 17 adds, to sent file history 70, a new item having the size, the update time, and the checksum of the direct-printable format file. The operation from step S5 to step S7 is the same as that of the first embodiment. In step S12, sent file history storage 17 deletes all of the items stored in sent file history 70 and then ends the process of FIG. 11.

Effects of Second Embodiment

The second embodiment achieves the effects of the first embodiment. Further, the second embodiment can prevent printing the cumulative files even through the cumulative files are stored in specified folder 21. This further simplifies user operation of print instruction for each folder and prevents the printer from printing the same file twice, thereby reducing the print media (for example, paper sheets) and the printing time.

Modifications

The invention is not limited to the above described embodiments and includes various modifications or the like. The modifications or the like includes the followings (a) to (i), for example.

(a) Modification (a) may have a configuration wherein icon specifying unit 11a of event handler 11 shown in FIGS. 1 and 9 specifies a file such as file 22a, menu displaying unit 11b in response to operation of mouse 3, icon specifying unit 11a displays an operation menu including operations such as "Direct Print" with respect to the specified file, and then menu selection unit 11c displays direct print dialogue box 50 for inquiring a destination printer and an job type when "Direct Print" is selected.

In modification (a), event handler 11 of FIG. 9 functions as a file specifying unit for specifying a file as a print target file, and file analyzing unit 14 analyzes the format (for example, the extension) of the print target file. Therefore, in modification (a), user operation upon right-clicking on a folder icon is the same as user operation upon right-clicking on a file icon, thereby simplifying the users operation.

(b) In step 4 shown in FIGS. 8 and 11, file analyzing unit 14 determines whether or not a file in the print target folder has a file format (file extension) that is able to be direct-printed by the destination printer (30a or 30b). The determination is made based on the file extension in the first and second embodiments. In modification (b), the determination may be executed based on a necessary key of the file format or based on header information of the file, instead of the file extension. Therefore, modification (b) can accurately determine the file format, even when a wrong extension has been attached to the file by mistake.

(c) In the first and second embodiments, mouse 3 is connected to print systems 1 and 1A (FIGS. 1 and 9). In modification (c), a pointing device such as a touch-pad, a trackball, a touch screen, or the like may be connected to print system. Modification (c) can achieve the same effects as in the first and second embodiments.

(d) In modification (d), menu displaying unit 11b of event handler 11 displays menu 40 with operation menu item 41d of "Direct Print" even when no printer (30a and 30b) is connected to print system 1 or 1A (see FIG. 1 or 9), and then menu selection unit 11c checks whether any printers (30a and 30b) are connected to the print system (1 or 1A) when menu item 41d of "Direct Print" is selected. When it is determined that no printer (30a and 30b) is connected, menu selection unit 11c displays a warning message box saying "no printer is connected".

(e) In modification (e), menu displaying unit 11b of event handler 11 displays right-click menu 40 with operation menu item 41d of "Direct Print" even when no printer (30a and 30b) is connected to print system 1 or 1A (see FIG. 1 or 9), and menu selection unit 11c checks whether any printers (30a and 30b) are connected to the print system (1 or 1A) when menu item 41d of "Direct Print" is selected. When it is determined that no printer (30a and 30b) is connected, menu selection unit 11c displays direct print dialogue box 50 with blank destination printer display area 51a and blank destination selection drop-down list 51c.

(f) Modification (f), which is a modification of the second embodiment, includes a determination process instruction unit configured to determine whether or not to execute the determination process of file duplication determination unit 18 by using direct print dialogue box 50 or the like. Only when a determination process instruction unit instructs file duplication determination unit 18 to execute the determination process, file duplication determination unit 18 executes the determination process. According to modification (f), when the determination process of file duplication determination unit 18 is not needed, the determination process can be omitted (skipped) to speed up the direct print.

(g) In the second embodiment, file duplication determination unit 18 calculates the checksum of the corresponding file in step S8 of FIG. 11, and compares the corresponding file with items in sent file history 70 of sent file history storage 17, to determine whether there is any item whose update time, size, and checksum are all identical to those of the corresponding file in step S10 of FIG. 11. In modification (g), which is a modification of the second embodiment, file duplication determination unit 18 does not execute the calculation of the checksum in step S8 and then compares the update time and the size of the corresponding file with those of items in sent file history 70 so as to determine whether the corresponding file is a duplicated file of any item in sent file history 70 in step S10. According to modification (g), sent file history 70 needs to store the update time and the size of each item but does not need to store the checksum of each item. Therefore, file duplication determination unit 18 can complete the determination process faster, thereby speeding up the direct print.

(h) In order to determine whether there is any item that is identical to the corresponding file in step S10 of FIG. 11, file duplication determination unit 18 may compare the update time and the checksum of the corresponding file with those of each item in sent file history 70, may compare the size and the checksum of the corresponding file with those of each item in sent file history 70, or may compare only the checksum of the corresponding file with that of each item in sent file history 70. Modification (h) achieves the same effect as the second embodiment.

(i) The first and second embodiments analyze the file format of all the print target files, which are the files in the print target folder, to determine whether each print target file is printable by the destination printer and then transmit only the printable format files to the destination printer. Modification (i) may analyze the file format of all the print target files, which are the files in the print target folder, to determine whether each print target file is printable by the destination printer and then transmit all the print target files with the analyzing result of the file analyzing unit. In modification (i), the destination printer may print only the printable format files based on the analyzing result of the file analyzing unit.

(j) Printer 30a or 30b in the first and second embodiments may be other print devices (image forming apparatus) having a print engine, such as a copying machine, facsimile machine, MFP (Multifunction Printer/Product/Peripheral), or the like. That is, a print device according to the invention means a device having a print engine, such as a printer, a copying machine, facsimile machine, MFP (Multifunction Printer/Product/Peripheral), or the like.

(k) A print device according to the invention may include; a print engine configured to print a file on a medium; an interface unit able to communicate with a storage connectable to the print device; a folder specifying unit configured to specify one of folders stored in the storage as a print target folder, a file analyzing unit configured to analyze a format of each of print target files, which are all files in all hierarchical levels in the print target folder, and to determine whether each print target file is a printable format file which has one of formats printable by the print engine, and a transmission unit configured to transmit, to the print engine, the printable format file. Such a print device can achieve a similar effect to the above embodiment.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:

1. A print system comprising:
   print devices each of which is configured to print a file on a medium; and
   a controller able to communicate with the print devices, the controller including:
   a storage;
   a folder specifying unit configured to specify a folder stored in the storage as a print target folder;
   a destination specifying unit configured to specify one of the print devices as a destination print device;
   a file analyzing unit configured to analyze all files in the print target folder;
   a transmission unit configured to transmit, to the destination print device, all the files; and
   a file duplication determination unit configured to determine whether or not a printable format file, which is a print target file that is determined by the file analyzing unit to have one of a plurality of printable formats printable by a print engine, is a duplicate of one in a sent file history,
   wherein the sent file history includes a list of files that were transmitted to the destination print device.

2. The print system according to claim 1, wherein the file duplication determination unit is configured to determine whether or not a printable format file is a duplicate of one in the sent file history by calculating checksums of the corresponding files.

3. The print system according to claim 1, further comprising:
   a sent file history storage configured to store the sent file history of files that are transmitted from the transmission unit,
   wherein the sent file history that is used by the file duplication determination unit is cleared from the sent file history storage when all files within the specified folder have been checked and processed.

4. A print system comprising:
   print devices each of which is configured to print a file on a medium; and
   a controller able to communicate with the print devices, the controller including:
   a storage;
   a folder specifying unit configured to specify a folder stored in the storage as a print target folder; and
   a destination specifying unit configured to specify one of the print devices as a destination print device;
   a file analyzing unit configured to analyze a format of each print target file, which is each file in all hierarchical levels in the print target folder, and to determine whether each print target file is a printable format file, which has a printable format printable by the destination print device;
   a transmission unit configured to transmit the printable format file to the destination print device; and
   a file duplication determination unit configured to determine whether or not the printable format file, which is the print target file that is determined by the file analyzing unit to have one of the printable formats printable by a print engine, is a duplicate of one in a sent file history,
   wherein the sent file history includes a list of files that were transmitted to the destination print device.

5. The print system according to claim 4, wherein the controller further includes a file specifying unit configured to specify a file stored in the storage as a second print target file,
   wherein the file analyzing unit is capable of determining whether or not the second print target file that is specified by the file specifying unit is printable by the destination print device.

6. The print system according to claim 4, wherein the file analyzing unit is configured to determine whether an extension of the print target file is identical to an extension of the printable format, thereby determining whether the print target file is a printable format file.

7. The print system according to claim 4, wherein the file analyzing unit is configured to determine whether the print target file has a key field that is required in one of the printable formats, thereby determining whether the print target file is a printable format file.

8. The print system according to claim 4, wherein the file analyzing unit is configured to determine whether the print target file has header information that is required in one of the printable formats, thereby determining whether the print target file is a printable format file.

9. The print system according to claim 4, wherein the folder specifying unit further includes:
an icon specifying unit configured to specify a folder icon in response to a pointing device;
a menu displaying unit configured to display a menu having operation menu items for the folder that corresponds to the folder icon specified by the icon specifying unit; and
a menu selection unit configured to select one of the operation menu items in response to the pointing device.

10. The print system according to claim 9, wherein the menu displaying unit is configured to display the menu without an operation menu item that relates to the print devices, when none of the print devices is connected to the print system.

11. The print system according to claim 9, wherein the menu selection unit is configured to display a warning message when none of the print devices is connected to the print system and an operation menu item that relates to the print devices is selected.

12. The print system according to claim 9, wherein when identical files exist among the printable format files, the transmission unit transmits only one of the identical files to the destination print device.

13. The print system according to claim 4, wherein the file duplication determination unit is configured to determine whether or not a printable format file is a duplicate of one in the sent file history by calculating checksums of the corresponding files.

14. The print system according to claim 4, further comprising:
a sent file history storage configured to store the sent file history of files that are transmitted from the transmission unit,
wherein the sent file history that is used by the file duplication determination unit is cleared from the sent file history storage when all files within the specified folder have been checked and processed.

15. A print system, comprising:
print devices each of which is configured to print a file on a medium; and
a controller able to communicate with the print devices, the controller including:
a storage;
a folder specifying unit configured to specify a folder stored in the storage as a print target folder; and
a destination specifying unit configured to specify one of the print devices as a destination print device;
a file analyzing unit configured to analyze a format of each print target file, which is each file in all hierarchical levels in the print target folder, and to determine whether each print target file is a printable format file, which has a printable format printable by the destination print device;
a transmission unit configured to transmit the printable format file to the destination print device;
a sent file history storage in which a sent file history is stored, the sent file history being a list of files that were transmitted to the destination print device; and
a file duplication determination unit configured to determine whether or not the printable format file, which is the print target file that is determined by the file analyzing unit to have one of the printable formats, is a duplicate of one in the sent file history,
wherein the transmission unit transmits only a non-duplicate file, which is determined by the file duplication determination unit as a non-duplicate file among the printable format files, and updates the sent file history by adding information of the non-duplicate file.

16. The print system according to claim 15, wherein the controller further includes a determination process instruction unit configured to determine whether to execute the determination process of the file duplication determination unit, and
wherein the file duplication determination unit executes the determination process based on the determination of the determination process instruction unit.

17. The print system according to claim 15, wherein the file analyzing unit resets the sent file history storage after processing all the files in the print target folder.

18. The print system according to claim 15, wherein the file duplication determination unit determines whether or not the printable format file is a duplicate of one in the sent file history by referring a size, an update time, and a checksum of the printable format file.

19. The print system according to claim 15, wherein the file duplication determination unit determines whether or not the printable format file is a duplicate of any item in the sent file history by referring a size and an update time of the printable format file.

20. The print system according to claim 15, wherein the file duplication determination unit determines whether or not the printable format file is a duplicate of one in the sent file history by referring a size and a checksum of the printable format file.

21. The print system according to claim 15, wherein the file duplication determination unit determines whether or not the printable format file is a duplicate of any item in the sent file history by referring an update time and a checksum of the printable format file.

22. The print system according to claim 15, wherein the file duplication determination unit determines whether or not the printable format file is a duplicate of any item in the sent file history by referring a checksum of the printable format file.

23. A print device comprising:
a print engine configured to print a file on a medium;
an interface unit able to communicate with a storage connectable to the print device;
a folder specifying unit configured to specify one of folders stored in the storage as a print target folder;
a file analyzing unit configured to analyze a format of each print target file, which is each file in all hierarchical levels in the print target folder, and to determine whether each print target file is a printable format file which has a printable format printable by the print engine,
a transmission unit configured to transmit, to the print engine, the printable format file; and
a file duplication determination unit configured to determine whether or not the printable format file, which is the print target file that is determined by the file analyzing unit to have one of the printable formats, is a duplicate of one in a sent file history,
wherein the sent file history includes a list of files that were transmitted to a destination print device.

24. A print device according to claim 23, wherein the storage is provided in an external device that is detachably-connectable to the interface unit of the print device.

25. The print device according to claim 23, wherein the file duplication determination unit is configured to determine whether or not a printable format file is a duplicate of one in the sent file history by calculating checksums of the corresponding files.

26. The print device according to claim 23, further comprising:
a sent file history storage configured to store the sent file history of files that are transmitted from the transmission unit,
wherein the sent file history that is used by the file duplication determination unit is cleared from the sent file history storage when all files within the specified folder have been checked and processed.

* * * * *